United States Patent
Park et al.

(10) Patent No.: US 8,112,640 B2
(45) Date of Patent: Feb. 7, 2012

(54) METHOD OF CONTROLLING VOLTAGE OF POWER SUPPLIED TO 3D GRAPHICS DATA PROCESSOR AND THE 3D GRAPHICS DATA PROCESSOR USING THE METHOD

(75) Inventors: Chan-min Park, Seongnam-si (KR); Ji-hong Kim, Seoul (KR)

(73) Assignees: Samsung Electronics Co., Ltd., Suwon-Si (KR); Seoul National University Industry Foundation, Seoul (KR)

( * ) Notice: Subject to any disclaimer, the term of this patent is extended or adjusted under 35 U.S.C. 154(b) by 843 days.

(21) Appl. No.: 11/905,495

(22) Filed: Oct. 1, 2007

(65) Prior Publication Data

US 2008/0079732 A1  Apr. 3, 2008

(30) Foreign Application Priority Data

Oct. 2, 2006  (KR) ........................ 10-2006-0097445
Sep. 19, 2007  (KR) ........................ 10-2007-0095414

(51) Int. Cl.
*G06F 1/00* (2006.01)
*G06F 1/26* (2006.01)
*G06F 15/00* (2006.01)
*G09G 5/00* (2006.01)
*H04N 5/228* (2006.01)
*H04N 5/14* (2006.01)
*H04N 7/12* (2006.01)
*H04N 9/70* (2006.01)
*H04N 5/93* (2006.01)

(52) U.S. Cl. ........ 713/300; 713/320; 345/501; 345/619; 345/660; 348/208.16; 348/700; 375/240.05; 375/240.08; 375/240.13; 386/300; 386/353

(58) Field of Classification Search .................. 713/300, 713/320; 345/501, 619, 660; 348/208.16, 348/700; 375/240.05, 240.08, 240.13; 386/111, 386/124, 300, 353

See application file for complete search history.

(56) References Cited

U.S. PATENT DOCUMENTS

| | | | | |
|---|---|---|---|---|
| 7,106,336 | B1 * | 9/2006 | Hutchins ........................ | 345/530 |
| 7,562,245 | B1 * | 7/2009 | Cai et al. ........................ | 713/500 |
| 2006/0136764 | A1 * | 6/2006 | Munguia ........................ | 713/322 |
| 2006/0174303 | A1 * | 8/2006 | Yoshimoto et al. ........... | 725/114 |
| 2007/0274385 | A1 * | 11/2007 | He ............................ | 375/240.12 |

OTHER PUBLICATIONS

Kihwan Choi, Karthik Dantu, Wei-Chung Cheng, Massoud Pedram, Frame-Based Dynamic Voltage and Frequency Scaling for a MPEG Decoder, International Conference on Computer Aided Design, 2002. ICCAD 2002. IEEE/ACM, Nov. 10-14, 2002, 10.1109/ICCAD.2002.1167613, pp. 732-737.*

(Continued)

*Primary Examiner* — Stefan Stoynov
(74) *Attorney, Agent, or Firm* — Staas & Halsey LLP (57) ABSTRACT

Provided is a method and of controlling a voltage of power supplied to a 3-dimensional (3D) graphics data processor and the 3D graphics data processor using the method. The method includes controlling the voltage of the power supplied to the graphics data processor based on the amount of data representing an object included in graphics data and re-controlling the voltage of the power supplied to the graphics data processor based on a time difference between scheduled processing time according to the controlled voltage for the object and actual processing time consumed by the graphics data processor, thereby reducing power consumption.

17 Claims, 5 Drawing Sheets

OTHER PUBLICATIONS

Intel StrongARM SA-1110 Microprocessor, Advance Information Brief Datasheet, Jul. 1999.*

Kameyama, M. et al., *3D Graphics LSI Core for Mobile Phone "Z3D,"* Graphics Hardware, 2003, pp. 60-67.

Woo, R. et al., *A 210mW Graphics LSI Implementing Full 3D Pipeline with 264Mtexels/s Texturing for Mobile Multimedia Applications,* IEEE International Solid-State Circuits Conference, Session 2, Multimedia Signal Processing, Paper 2.4, Feb. 19, 2003 (10 pp.).

Mochocki, B. et al., *Power Analysis of Mobile 3D Graphics,* 2006 EDAA (6 pp.).

Euh, J. et al., *A Low-Power Content-Adaptive Texture Mapping Architecture for Real-Time 3D Graphics,* University of Massachusetts Amherst, Department of Electrical and Computer Engineering (11 pp.).

* cited by examiner

METHOD OF CONTROLLING VOLTAGE OF POWER SUPPLIED TO 3D GRAPHICS DATA PROCESSOR AND THE 3D GRAPHICS DATA PROCESSOR USING THE METHOD

CROSS-REFERENCE TO RELATED PATENT APPLICATION

This application claims the benefit of Korean Patent Application Nos. 10-2006-0097445, filed on Oct. 2, 2006 and 10-2007-0095414, filed on Sep. 19, 2007, in the Korean Intellectual Property Office, the disclosure of which is incorporated herein in its entirety by reference.

BACKGROUND OF THE INVENTION

1. Field of the Invention

The present invention generally relates to a method of controlling the voltage of power supplied to a 3-dimensional (3D) graphics data processor and the 3D graphics data processor using the method, and more particularly, to a method of controlling the voltage of power supplied to a 3D graphics data processor by using dynamic voltage scaling (DVS) and the 3D graphics data processor using the method.

2. Description of the Related Art

OpenGL-ES, Java Mobile 3-dimensional (3D) Graphics Application Program Interface (API), Direct 3D Mobile, and the like are recent standard APIs for mobile 3D graphics. OpenGL-ES, which is a subset of OpenGL, is a cross-platform API standardized for 2D/3D graphics functions in embedded systems.

Reduction of power consumption without a compromise with the performance of a mobile device is an important requirement for a mobile device that is supplied with power from a battery, such as a personal digital assistant (PDA) or a cellular phone. In particular, effective power management is most important to mobile 3D graphics applications such as 3D games or 3D navigations. This is because a number of floating calculations are required per vertex and a number of memory accesses per fragment are required during 3D graphics data processing, resulting in a shortage of power.

SUMMARY OF THE INVENTION

The present invention provides a method of controlling the voltage of power supplied to a 3-dimensional (3D) graphics data processor to reduce power consumption, and the 3D graphics data processor using the method.

The present invention also provides a computer-readable recording medium having recorded thereon a program for executing the method.

According to one aspect of the present invention, there is provided a method of controlling a voltage of power supplied to a graphics data processor. The method includes controlling the voltage of the power supplied to the graphics data processor based on the amount of data representing an object included in graphics data and re-controlling the voltage of the power supplied to the graphics data processor based on a time difference between scheduled processing time according to the controlled voltage for the object and actual processing time consumed by the graphics data processor.

According to another aspect of the present invention, there is provided a computer-readable recording medium having recorded thereon a program for executing the method of controlling a voltage of power supplied to a graphics data processor.

According to another aspect of the present invention, there is provided a graphics data processor capable of controlling a voltage. The graphics data processor includes a workload estimation unit estimating the amount of data representing an object included in the graphics data, a voltage control unit controlling a voltage of power supplied to the graphics data processor based on a time difference between scheduled processing time according to the controlled voltage for the object and actual processing time consumed by the graphics data processor and the amount of data of a new object, which is estimated by the workload estimation unit, and an execution result analysis unit analyzing the time difference considered by the voltage control unit from a result of processing the graphics data by the graphics data processor.

BRIEF DESCRIPTION OF THE DRAWINGS

The above and other features and advantages of the present invention will become more apparent by describing in detail an exemplary embodiment thereof with reference to the attached drawings in which.

DETAILED DESCRIPTION OF THE INVENTION

Hereinafter, an exemplary embodiment of the present invention will be described in detail with reference to the accompanying drawings. It should be noted that like reference numerals refer to like elements illustrated in one or more of the drawings. In the following description of the present invention, detailed description of known functions and configurations incorporated herein will be omitted for conciseness and clarity.

Figure 1:
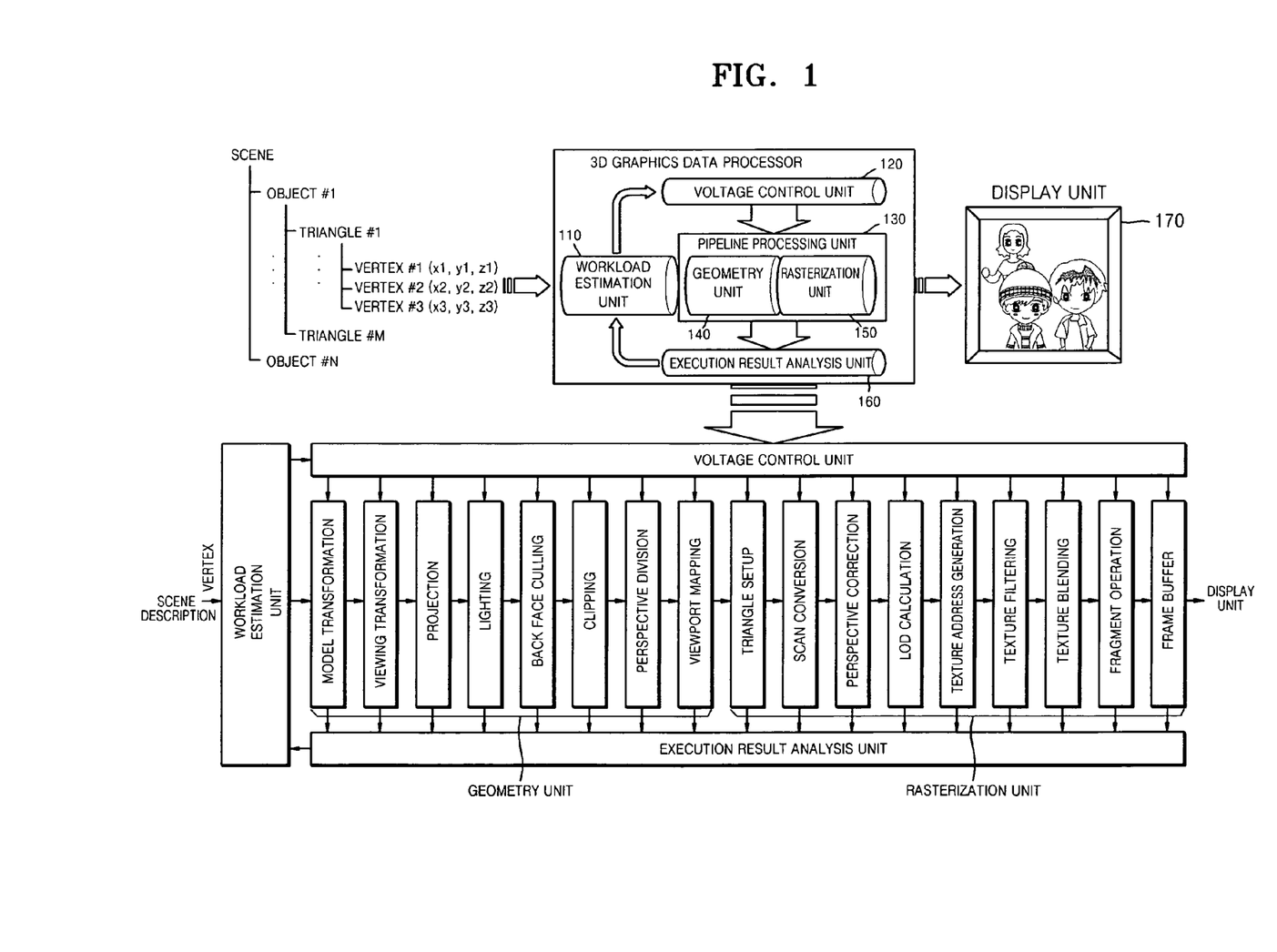
FIG. 1 is a block diagram of a 3-dimensional (3D) graphics data processor capable of controlling a voltage according to an exemplary embodiment of the present invention.

FIG. 1 is a block diagram of a 3-dimensional (3D) graphics data processor capable of controlling a voltage according to an exemplary embodiment of the present invention.

Referring to FIG. 1, the 3D graphics data processor includes a workload estimation unit 110, a voltage control unit 120, a pipeline processing unit 130, an execution result analysis unit 160, and a display unit 170. The pipeline processing unit 130 includes a geometry unit 140 and a rasterization unit 150.

A pipeline manner is a data processing method in which a series of processes are divided into a plurality of processes and the divided processes can process different data simultaneously and in parallel.

The pipeline processing unit 130 processes 3D graphics data in the pipeline manner. The pipeline processing unit 130 includes the geometry unit 140 and the rasterization unit 150 as mentioned above. A predetermined process for the geometry unit 140 and the rasterization unit 150 is often called a stage. Hereinafter, stages will be described in detail.

The geometry unit 140 performs calculations associated with primitives and vertices. The geometry unit 140 performs a calculation for each received vertex. The geometry unit 140 performs processing such as model transformation, viewing transformation, projection, lighting, back face culling, clipping, perspective division, and viewport mapping on the received vertex.

Model transformation is the process of transforming coordinates expressing a 3D object from a local coordinate system into a world coordinate system on a 3D space. Viewing transformation is the process of transforming a coordinate of a 3D object transformed to the world coordinate system into a coordinate of a camera coordinate system based on a viewpoint (or a camera). Projection is the process of projecting the 3D object transformed to the camera coordinate system onto a 2D screen. Lighting is the process of expressing a reflection effect with a light source to improve the reality of the 3D object. Back face culling is the process of removing a portion that faces away from the viewpoint in the camera coordinate system. Clipping is the process of removing a portion of a primitive, which lies outside a view volume, in order to deliver only the other portion of the primitive, which lies within the view volume, to the rasterization unit 150. Perspective division makes an object appear smaller when it lies farther away from the viewpoint. Viewport mapping is the process of transforming coordinates of a projection window into a rectangular region of a screen called a viewport. The projection window refers to a 2D region within a frustum used to render a 2D representation of a 3D scene.

The rasterization unit 150 calculates an accurate color of each pixel using the coordinates of each vertex of, the color of, and the texture coordinates of a 3D object, which are provided by the geometry unit 140. The rasterization unit 150 performs processing for each fragment corresponding to each pixel of a frame buffer. The fragment includes color data, 3D position coordinates, and texture coordinates generated by interpolation.

The rasterization unit 150 performs processing such as triangle setup, scan conversion, perspective correction, level-of-detail (LOD) calculation, texture address generation, texture filtering, texture blending, and a fragment operation.

Triangle setup is the process of searching for vertices of a triangle. Scan conversion is the process of filling a side of the triangle with pixels along scan lines of a monitor. Perspective correction is the process of reflecting an influence from a Z value in a frame when a texel is mapped to a polygon. LOD calculation is the process of representing a 3D model or geography simply or in detail according to a distance from the camera. Texture address generation is the process of generating an address for texture mapping. Texture filtering is the process of making the color of a texel appear natural using neighboring texels of the texel on a texture. A texel refers to an element of an image used for texture mapping. Texture blending is the process of blending at least one texture for texture mapping. The fragment operation is the process of changing or removing particular fragments before information about each pixel is stored in a frame buffer. The frame buffer refers to a buffer that stores information about each pixel displayed onto the screen.

Upon input of a scene description, the pipeline processing unit 130 processes the input scene description and generates a frame. The scene description is composed of n objects and each of the n objects is composed of m triangles. Each of the m triangles is composed of 3 vertices. A primitive is a basic unit expressing a 3D object and includes vertices, lines, and polygons. The triangle may also be included in the primitive.

The workload estimation unit 110 estimates workload that affects a voltage used by a stage for the pipeline processing unit 130 from the scene description. The workload means the amount of data to be processed by the pipeline processing unit 130 and higher frequency and voltage are required for the larger amount of data.

Factors that affect the voltage used by the stage and can be estimated from the scene description may include the number of vertices and the number of triangles. According to an exemplary embodiment of the present invention, the workload estimation unit 110 is fed back with the analysis result of processing of a previous object by the pipeline processing unit from the execution result analysis unit 160 in order to reflect the analysis result into workload estimation for the current object to be processed.

The workload estimation unit 110 has a vertex caching function for storing information about vertices included in the scene description. The vertex caching function removes a need for transformation and lighting of repetitively shared vertices. This is because neighboring triangles generally share vertices in most 3D applications. Thus, prior to model transformation of the geometry unit 140, the vertex caching function is executed using a binary search tree. Once a new vertex is input to the pipeline processing unit 130, the workload estimation unit 110 searches a vertex cache in order to check if the same vertex has ever been processed. If so, the previous processing result is used as information about the new vertex. In this way, model transformation, viewing transformation, or light stage, which is a computationally intensive part, can be skipped. In particular, in applications requiring a complex lighting model, the vertex cache makes it possible to avoid the complex lighting stage because shared vertices can have the same average normal vector from neighboring triangles.

When a change between information about a predetermined object included in a previous frame and information about the predetermined object included in the current frame is not greater than a threshold value, the workload estimation unit 110 reuses the information about the predetermined object included in the previous frame. However, when the change is greater than the threshold value, the workload estimation unit 110 analyzes the information about the predetermined object included in the current frame. For example, if the number of vertices of a first object in the current frame changes 20% or more when compared to the number of vertices of the first object in a previous frame, the workload estimation unit 110 determines that the characteristics of the first object change.

The voltage control unit 120 controls the voltage and frequency of power supplied to the 3D graphics data processor based on the workload of an object or a frame, which is estimated by the workload estimation unit 110. The voltage control unit 120 controls the voltage and frequency of each stage of the pipeline processing unit 130. Voltage control by the voltage control unit 120 will be described later in more detail with reference to FIGS. 2 and 3A through 3C.

The pipeline processing unit 130 receives 3D graphics data from the workload estimation unit 110 and processes the 3D graphics data in the pipeline manner.

The geometry unit 140 performs calculation associated with primitives and vertices of an object. The rasterization unit 150 calculates the accurate color of each pixel using the coordinates of each vertex of, the color of, and the texture coordinates of the 3D object provided by the geometry unit 140.

The execution result analysis unit 160 analyzes the processing result of the 3D graphics data by the pipeline processing unit 130 and outputs the analysis result to the workload estimation unit 110. The execution result analysis unit 160 feeds information about slack time generated by executing each stage of the pipeline processing unit 130 back to the workload estimation unit 110. The slack time means the time obtained by subtracting the actual processing time consumed to process the 3D graphics data by the pipeline processing unit 130 from the scheduled processing time for the 3D graphics data. When the slack time generated during previous processing of the pipeline processing unit 130 is long, the voltage of power currently supplied to the pipeline processing unit 130 is lowered, thereby reducing power consumption.

The display unit 170 receives pixel information from the frame buffer of the rasterization unit 150 and displays the received pixel information to a user.

Figure 2:
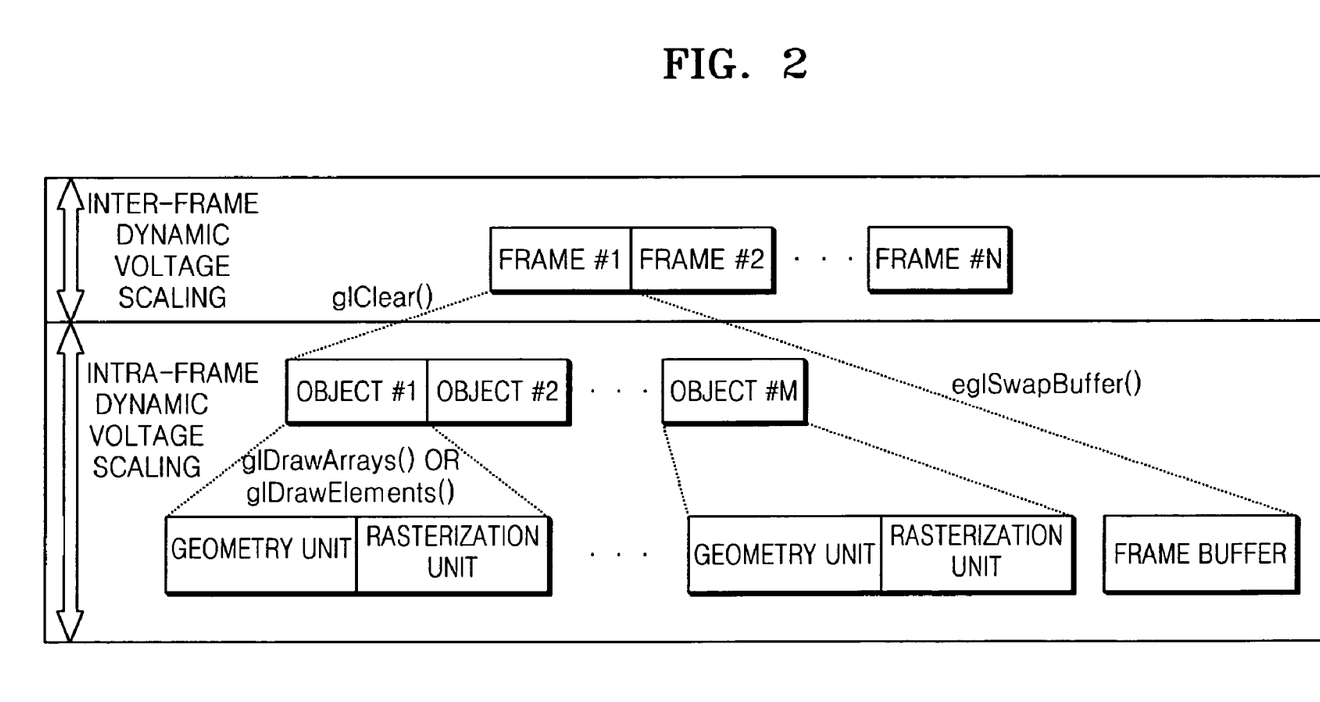
FIG. 2 is a diagram for explaining the concept of inter-frame dynamic voltage scaling (DVS) and the concept of intra-frame DVS according to an exemplary embodiment of the present invention.

FIG. 2 is a diagram for explaining the concept of inter-frame dynamic voltage scaling (DVS) and the concept of intra-frame DVS according to an exemplary embodiment of the present invention.

Inter-frame DVS refers to controlling of the voltage of power supplied to the pipeline processing unit 130 for each frame. Intra-frame DVS refers to controlling of the voltage of power supplied to the pipeline processing unit 130 for each object included in a frame.

Hereinafter, DVS will be described in more detail.

Dynamic power management (DPM) and DVS are two representatives of various low-power techniques. When resources such as a memory bank, a disk drive, a display, and a network are used, DPM switches the resources to a low-power mode or shuts down the resources according to the power management state of the resources, i.e., an active state, an idle state, a sleep state, and a shutdown state. On the other hand, DVS lowers the operating speed and use voltage of a processor using slack time, thereby reducing power consumption. Since power consumption is proportional to the square of voltage, DVS can achieve effective low power consumption by lowering voltage.

In particular, a method of reducing power consumption by the 3D graphics data processor according to an exemplary embodiment of the present invention using inter-frame DVS and intra-frame DVS is suggested.

In intra-frame DVS, the workload estimation unit 110 estimates workload for each object based on a scene description. If workload that is actually generated in object processing by the pipeline processing unit 130 is smaller than the workload that is estimated by the workload estimation unit 110, the voltage control unit 120 lowers the voltage of power supplied to the pipeline processing unit 130. In this way, intra-frame DVS uses slack time generated in the current frame. On the other hand, inter-frame DVS to be described later uses slack time generated in a previous frame.

Hereinafter, calculation of slack time will be described.

The pipeline processing unit 130 of the 3D graphics data processor according to an exemplary embodiment of the present invention includes n stages $P=\{p_{stage-1}, \ldots, p_{stage-n}\}$. In order to express each stage $P_{stage-i}$ of the pipeline processing unit 130, a set including 4 elements $\{S_i, P_{th-i}, C_i, N_i\}$ is used.

Execution time $D_i$ consumed by the pipeline processing unit 130 to process a $j^{th}$ frame can be expressed as follows:

$$D_j = \sum \frac{C_i S_i N_i}{P_{th-i}} \quad (1 \leq i \leq n), \tag{1}$$

where $S_i$ indicates a state where the stage $P_{stage-i}$ of the pipeline processing unit 130 for processing 3D graphics data is enabled or disabled. The enabled or disabled state of the stage $P_{stage-i}$ is determined according to the characteristics of the 3D graphics data before each scene is rendered. The characteristics of the 3D graphics data mean whether or not lighting, texture mapping, and the like are performed.

The execution time of each stage may be changed according to the characteristics of the 3D graphics data.

$P_{th-i}$ indicates a throughput factor determined when the 3D graphics data processor according to an exemplary embodiment of the present invention is designed. $C_i$ indicates worst case execution time (WCET) of the $i^{th}$ stage $P_{stage-i}$ when the pipeline processing unit 130 processes the 3D graphics data at the maximum speed. $N_i$ indicates an iteration factor based on the number of primitives, the number of fragments, and depth complexity.

$C_i$ and $P_{th-i}$ are fixed values because they are determined when the 3D graphics data processor according to an exemplary embodiment of the present invention is designed, and a frame deadline and a bottleneck stage are calculated from the workload of an application. The frame deadline is time for representing a scene at a given frame rate at the highest frequency. Time for processing an object by the pipeline processing unit 130 is called an object deadline. The bottleneck stage provides the highest voltage or frequency from among stages.

It can be seen from Equation 1 that slack time is generated due to unbalance between $S_i$ and $N_i$ according to an application of the pipeline processing unit 130 even when the pipeline processing unit 130 is optimized well.

Execution time $B_j$ of the bottleneck stage from among stages executed when the pipeline processing unit 130 processes a frame can be expressed as follows:

$$B_j = \max\left\{\frac{C_j S_j N_j}{P_{th-i}}\right\} \quad (1 \leq i \leq n) \tag{2}$$

When compared to the bottleneck stage, the other stages have more slack times. This means that performance can be optimized by load-balancing or supply voltage can be lowered using these slack times in a system having a frame rate of $1/\max(D_j)$.

Referring to FIG. 2, there exist N frames and a plurality of objects exist for each of the N frames. 3D graphics data regarding an object is input to the pipeline processing unit 130, and the geometry unit 140 and the rasterization unit 150 process the 3D graphics data. When M objects exist in a frame #1, each of the M objects is separately input to the pipeline processing unit 130. Once the pipeline processing unit 130 processes the last object #M, frame pixel information for display is completely stored in the frame buffer.

It is assumed that, in the case of OpenGL-ES, one frame starts by a glClear( ) function call and ends by an eglSwapBuffer( ) function call and objects of the frame are distinguished by glDrawArrays( ) or glDrawElements( ) of an OpenGL-ES application.

When a frame is composed of m objects, the execution time $D_j$ consumed by the pipeline processing unit 130 to process the $j^{th}$ frame, which is expressed as Equation 1, can be changed as follows:

$$D_j = \sum_o \sum_i \frac{C_i S_i^o N_i^o}{P_{th-i}} \quad (1 \leq i \leq n, 1 \leq o \leq m), \tag{3}$$

where $S_i^o$, indicates a state where the stage $P_{stage-i}$ of the pipeline processing unit 130 for processing an $o^{th}$ object is enabled or disabled. The enabled or disabled state of the stage $P_{stage-i}$ is determined according to the characteristics of the 3D graphics data before each scene is rendered. The characteristics of the 3D graphics data mean whether or not lighting, texture mapping, and the like are performed. The execution time of each stage may be changed according to the characteristics of the 3D graphics data. $P_{th-i}$ indicates a throughput factor determined when the 3D graphics data processor according to an exemplary embodiment of the present invention is designed. $C_i$ indicates worst case execution time (WCET) of the $i^{th}$ stage $P_{stage-i}$ when the pipeline processing unit 130 processes the 3D graphics data at the maximum speed. $N_i'$ indicates an iteration factor based on the number of primitives, the number of fragments, and depth complexity. $N_i^o$ indicates an iteration factor based on the number of primitives, the number of fragments, and depth complexity in an $i^{th}$ stage of the pipeline processing unit 130 for processing the $o^{th}$ object.

In intra-frame DVS, each object may have static slack times and dynamic slack times by interposing the bottleneck stage between objects. It is assumed that a voltage and a frequency that can be changed range from 1 to s ($1 \leq k \leq s$) and a voltage level is changed to $V_k$ proportionally to a changed frequency of $f_k$. When intra-frame DVS uses slack times in order to control supply voltage, frequency is determined by static distribution of the slack times as in Equation 4 or by dynamic distribution of the slack times as in Equation 6. Static distribution uniformly distributes slack times generated due to the bottleneck stage over the other stages and can be expressed as Equation 4 and Equation 5 below.

$$F_o^{static} = \frac{\sum_{i=1}^{n} \frac{C_i S_i^o N_i^o}{P_{th-i}}}{\sum_{i=1}^{n} \frac{C_i S_{all}^o N_i^o}{P_{th-i}}}, \tag{4}$$

where $S_{all}^o$ indicates a state where all stages included in the pipeline processing unit 130 for processing an $o^{th}$ object are enabled. $F_o^{static}$ indicates a constant frequency for every stage, which is determined by uniformly distributing slack times over the stages of the pipeline processing unit 130. Thus, static distribution of the slack times can avoid frequent voltage scaling. However, since application of the constant $F_o^{static}$ to the stages may miss differences between the stages, a frequency $F_i^o$ is calculated for each stage as follows:

$$F_i^o = F_o^{static} \cdot \frac{\left(\frac{C_i S_i N_i}{P_{th-i}}\right)}{B_j} \tag{5}$$

In static distribution, a frequency is determined for each stage of the pipeline processing unit 130 using Equation 5.

Dynamic distribution determines a frequency for the current object using slack times generated during processing of a previous object as follows:

$$F_{o+1}^{dynamic} = \frac{\sum_{j=o+1}^{m} \sum_{i=1}^{n} \frac{C_i S_i^j N_i^j}{P_{th-i}}}{\sum_{j=1}^{m} \sum_{i=1}^{n} \frac{C_i S_{all}^j N_i^j}{P_{th-i}} - \sum_{j=1}^{o} \sum_{i=1}^{n} \frac{C_i S_i^j N_i^j}{P_{th-i}}}, \tag{6}$$

where $F_{o+1}^{dynamic}$ indicates a frequency for an (o+1)th object when dynamic distribution is used. $S_{all}^j$ indicates a state where all stages of the pipeline processing unit 130 for processing a $j^{th}$ object are enabled. $S_i^j$ indicates a state where an $i^{th}$ stage of the pipeline processing unit 130 for processing the $j^{th}$ object is enabled or disabled. $N_i^j$ indicates an iteration factor based on the number of primitives, the number of fragments, and depth complexity in an $i^{th}$ stage of the pipeline processing unit 130 for processing the $j^{th}$ object.

Figures 3A, 3B:
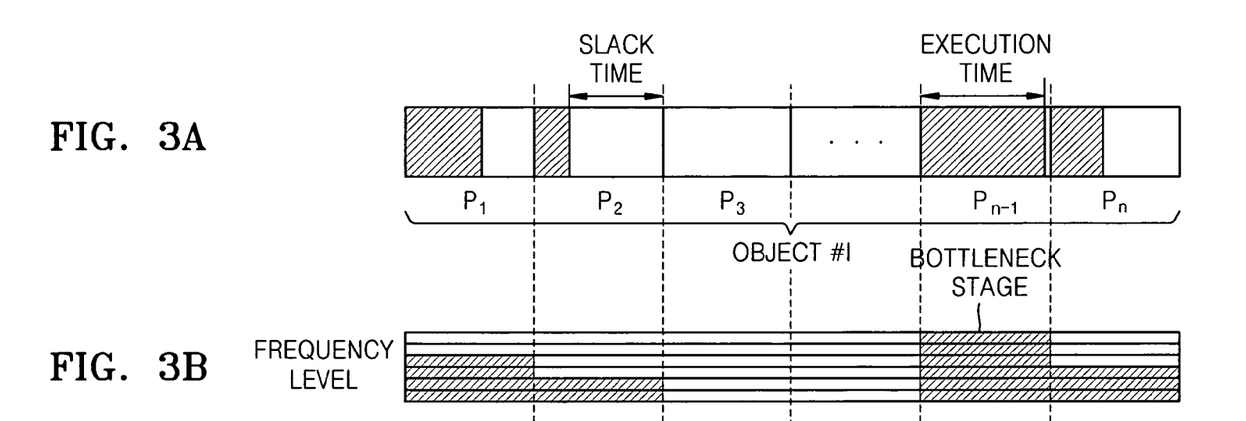
FIGS. 3A through 3C are diagrams illustrating slack times generated during inter-frame DVS and intra-frame DVS according to an exemplary embodiment of the present invention.
Figure 3C:
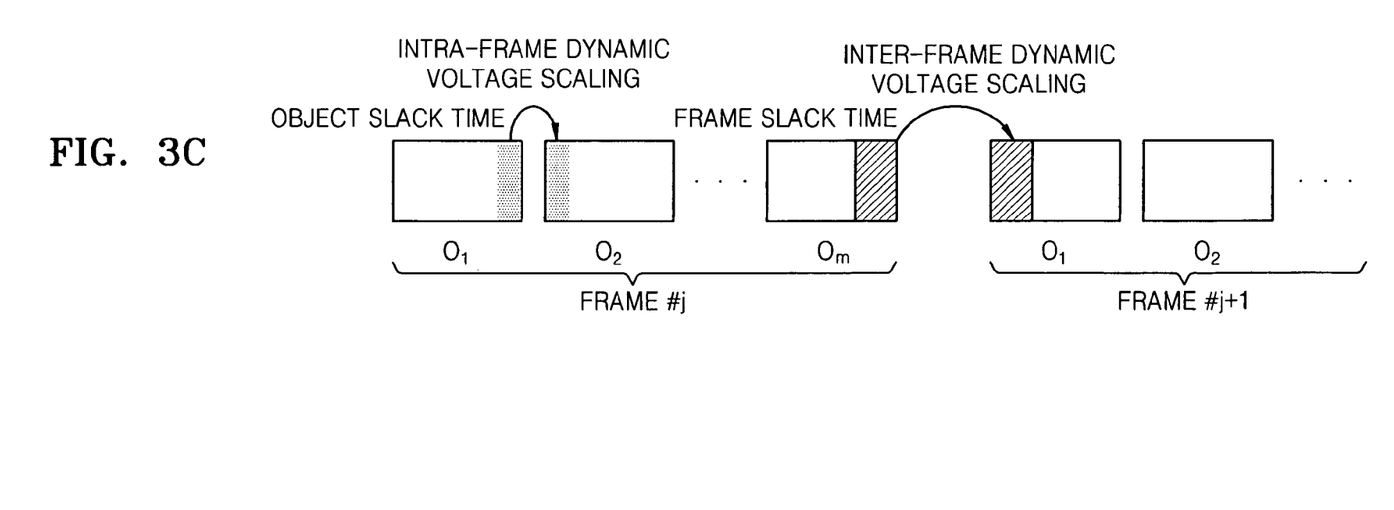

FIGS. 3A through 3C are diagrams illustrating slack times generated during inter-frame DVS and intra-frame DVS according to an exemplary embodiment of the present invention.

FIG. 3A illustrates slack times and execution times for each of N stages $P_1, P_2, \ldots, P_n$ of the pipeline processing unit 130 over time when the N stages process an object #i using intra-frame DVS. In FIG. 3A, dashed portions indicate execution times and non-dashed portions indicate slack times.

FIG. 3B illustrates a frequency level supplied for each of the N stages of the pipeline processing unit 130 in intra-frame DVS. As illustrated in FIGS. 3A and 3B, frequency supplied to a bottleneck stage is highest and slack time generated is smallest in the bottleneck stage.

FIG. 3C illustrates both intra-frame DVS and inter-frame DVS.

In intra-frame DVS, a frame #j includes m objects and slack time generated during processing of an object $O_1$ by the pipeline processing unit 130 is used to determine voltage and frequency for an object $O_2$. Voltage and frequency corresponding to an object $O_i$ input to the pipeline processing unit 130 are determined based on slack time generated during processing of a previous object $O_{i-1}$. Herein, $1 \leq i \leq m$.

In inter-frame DVS, slack time generated during processing of the last object $O_m$ of the frame #j by the pipeline processing unit 130 is considered to determine voltage and frequency corresponding to the first object of a frame #j+1.

Hereinafter, intra-frame DVS and inter-frame DVS will be described in more detail with reference to FIG. 1.

In intra-frame DVS, the voltage control unit 130 determines voltage and frequency to be supplied for stage execution prior to execution of stages, by using the workload estimated by the workload estimation unit 110 and the slack times fed back from the execution result analysis unit 160. In intra-frame DVS, upon completion of execution of stages for one object, the execution result analysis unit 160 outputs the analysis result of the execution of the stages to the workload estimation unit 110. When the workload estimation unit 110 outputs workload estimated for a newly received object and the analysis result for the object input from the execution result analysis unit 160 to the voltage control unit 120, the voltage control unit 120 controls voltage and frequency to be supplied to stages for processing the newly received object for each of the stages based on the input workload and analysis result.

In intra-frame DVS, a frequency level differs according to object. Since the execution time of each object may change per frame according to the dynamic characteristics of the object, an object list is created to store the characteristics of each object including the number of vertices, the number of triangles, the number of fragments, and execution time during rendering of a scene. Once the first frame is rendered, the object list is created and the created object list is updated each time a frame is processed by the pipeline processing unit 130. When the object list is updated, a change in the characteristics of an object is also stored in order to accurately predict consecutive frames or slack time of the object. If the change in the characteristics of the object is radical, the object list is initialized and reorganized. For example, a change of 20% or more in the number of vertices may be used as a criterion for the initialization.

In intra-frame DVS, slack time may also be generated by a change in the characteristics of a motion of a scene or an object. Such non-used dynamic slack time is added to a frame deadline for a next frame. At this time, the slack time of the previous frame is used for an object deadline for the first object of the next frame. The frame deadline is time for representing a scene at a given frame rate at the highest frequency. Time for processing an object by the pipeline processing unit 130 is called an object deadline.

In order to generate more slack times in intra-frame DVS, a vertex caching function is added to the object list. The vertex caching function removes a need for transformation and lighting of repetitively shared vertices. This is because neighboring triangles generally share vertices in most 3D applications. A vertex cache structure using a binary search tree is disposed in front of the model transformation stage of the geometry unit 140. Once a new vertex is input to the pipeline processing unit 130, a vertex cache is searched in order to check if the same vertex has ever been processed. If so, the previous processing result is used as information about the new vertex. In this way, model transformation, viewing transformation, or light stage, which is a computationally intensive part, can be skipped. In particular, in applications requiring a complex lighting model, the vertex cache makes it possible to avoid the complex lighting stage because shared vertices can have the same average normal vector from neighboring triangles. In an implementation of the present invention, the object list having a vertex cache can generate more slack times and is useful to manage voltage change in both inter-frame DVS and intra-frame DVS.

In inter-frame DVS, voltage and frequency to be supplied to the pipeline processing unit 130 for a newly received frame are determined based on the processing result of the current frame by the pipeline processing unit 130 and workload estimated for the newly received frame.

A case where the voltage of power supplied to the pipeline processing unit 130 is determined before the pipeline processing unit 130 begins processing is called static voltage determination and a case where the voltage of power supplied to the pipeline processing unit 130 is determined based on the fed-back processing result of the pipeline processing unit 130 is called dynamic voltage determination. In inter-frame DVS, the processing result of a previous frame by the pipeline processing unit 130 is fed back and voltage corresponding to a received frame is determined. Thus, dynamic voltage determination is applied to each frame. In intra-frame DVS, the processing result of a previous object by the pipeline processing unit 130 is fed back and voltage corresponding to a received object is determined. Thus, dynamic voltage determination is applied to each object. However, once a voltage corresponding to an object is determined, a voltage supplied to each stage of the pipeline processing unit 130 is determined prior to execution of the stage. Thus, static voltage determination is applied to each stage.

Figure 4:
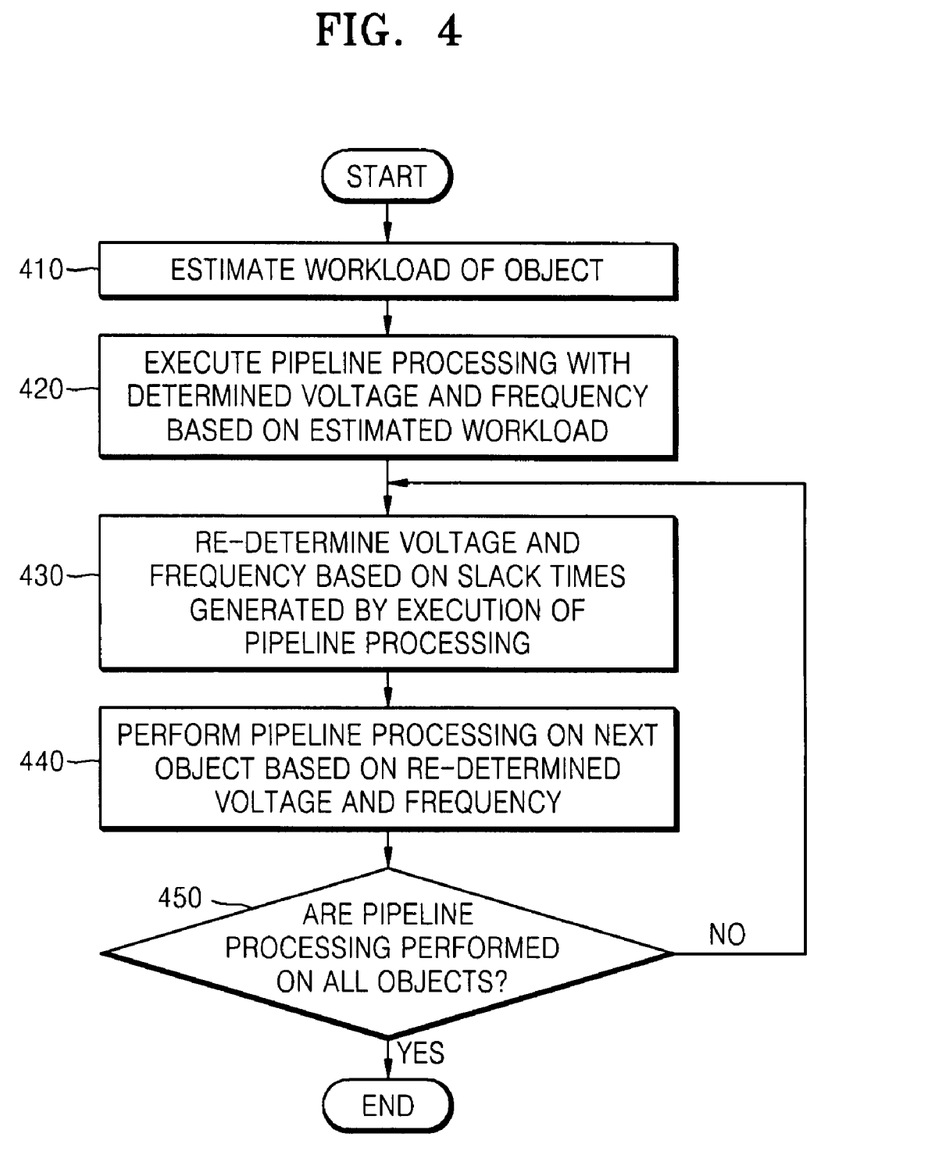
FIG. 4 is a flowchart illustrating a method of controlling a voltage when an object is processed in a pipeline manner according to an exemplary embodiment of the present invention.

FIG. 4 is a flowchart illustrating a method of controlling a voltage when an object is processed in the pipeline manner according to an exemplary embodiment of the present invention.

Referring to FIG. 4, the method includes operations that are time-serially processed by the 3D graphics data processor illustrated in FIG. 1. Thus, a description that has already been provided regarding the 3D graphics data processor illustrated in FIG. 1 is also applied to the method of controlling a voltage according to an exemplary embodiment of the present invention although a portion of the description is not provided below.

In operation 410, the 3D graphics data processor analyzes 3D graphics data information required to estimate the workload of one of objects included in a received frame, i.e., the number of vertices, the number of triangles, the number of fragments, a lighting parameter, and a texture parameter, and estimates workload in each stage. The workload means the amount of data to be processed by the pipeline processing unit 130. As the amount of data to be processed increases, higher frequency and voltage are required.

In operation 420, the 3D graphics data processor executes each stage of the pipeline processing unit 130 with determined voltage and frequency based on the estimated workload corresponding to one object. To this end, the 3D graphics data processor first determines voltage and frequency to be supplied to each stage of the pipeline processing unit 130 for processing the object and then executes each stage of the pipeline processing unit 130.

In operation 430, the 3D graphics data processor changes the voltage and frequency to be supplied to each stage based on slack time generated by the execution of each stage of the pipeline processing unit 130. More specifically, the workload estimation unit 110 is fed back with slack time that is the processing result of a previous object from the execution result analysis unit 160 and re-estimates the workload of a new object to be processed. The voltage control unit 120 re-determines voltage and frequency to be supplied to each stage based on the re-estimated workload and the fed-back slack time.

In operation 440, the 3D graphics data processor performs data processing on a next object in the pipeline manner using the re-determined voltage and frequency.

In operation 450, the 3D graphics data processor determines whether stages of the pipeline processing unit 130 are executed for all objects included in the received frame. If so, the method is terminated. If there remains an object that is not yet processed by the pipeline processing unit 130, the method goes to operation 430.

Figure 5:
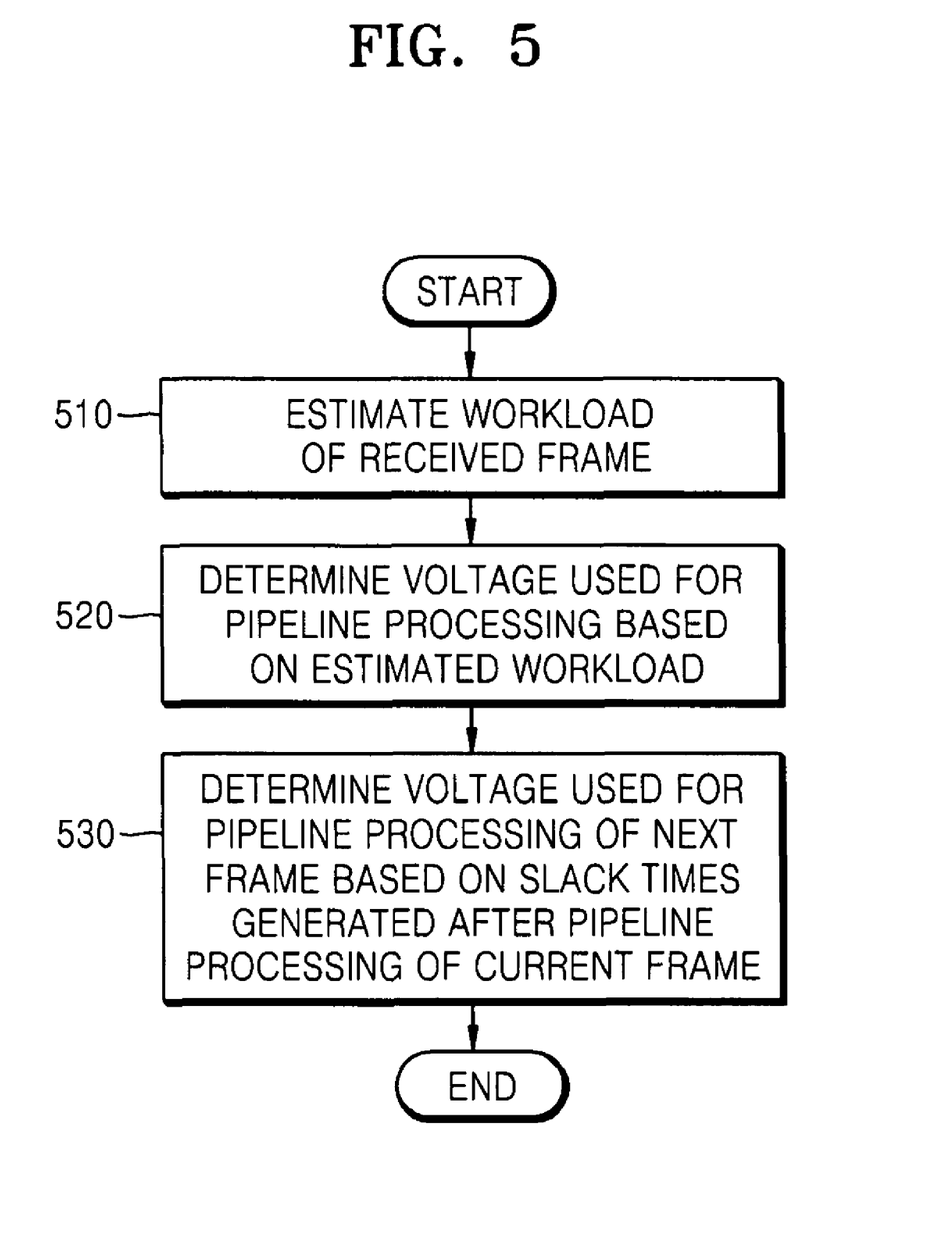
FIG. 5 is a flowchart illustrating a method of controlling a voltage when a frame is processed in a pipeline manner according to an exemplary embodiment of the present invention.

FIG. 5 is a flowchart illustrating a method of controlling a voltage when a frame is processed in the pipeline manner according to an exemplary embodiment of the present invention.

Referring to FIG. 5, the method includes operations that are time-serially processed by the 3D graphics data processor illustrated in FIG. 1. Thus, a description that has already been provided regarding the 3D graphics data processor illustrated in FIG. 1 is also applied to the method of controlling a voltage according to an exemplary embodiment of the present invention although a portion of the description is not provided below.

In operation 510, the 3D graphics data processor analyzes 3D graphics data information of objects included in a received frame, i.e., the number of vertices, the number of triangles, the number of fragments, a lighting parameter, and a texture parameter, and estimates the workload of the entire frame.

In operation 520, the 3D graphics data processor determines the voltage and frequency of power to be supplied to the pipeline processing unit 130 based on the estimated workload. At this time, the voltage and frequency of power to be supplied to the pipeline processing unit 130 are determined for each object and each stage.

In operation 530, the 3D graphics data processor determines voltage and frequency corresponding to a next frame based on slack times generated after the pipeline processing unit 130 processes all the objects included in the received frame. The determined voltage and frequency are voltage and frequency supplied to each object and each stage of the pipeline processing unit 130. The slack times generated after the pipeline processing unit 130 processes all the objects included in the received frame may be used for an object to be processed first by the pipeline processing unit 130 from among objects included in the next frame or may be used for all objects included in the next frame.

As described above, according to the present invention, in order to reduce power consumption in the 3D graphics data processor, voltage is reduced using slack times generated during 3D graphics data processing for a frame or an object, thereby reducing power consumption in 3D graphics data processing.

Meanwhile, the exemplary embodiment of the present invention can be written as computer programs and can be implemented in general-use digital computers that execute the programs using a computer readable recording medium. A data structure used in the exemplary embodiment of the present invention can be recorded in a computer-readable recording medium using various means.

Examples of the computer readable recording medium include magnetic storage media (e.g., ROM, floppy disks, hard disks, etc.), optical recording media (e.g., CD-ROMs, or DVDs), and other non-transitory computer readable storage media. The computer readable recording medium can also be distributed over network coupled computer systems so that the computer readable code is stored and executed in a distributed fashion.

While the present invention has been particularly shown and described with reference to an exemplary embodiment thereof, it will be understood by those of ordinary skill in the art that various changes in form and detail may be made therein without departing from the spirit and scope of the present invention as defined by the following claims.

What is claimed is:

1. A method of controlling a voltage of power supplied to a graphics data processor, the method comprising:
    controlling the voltage of the power supplied to the graphics data processor based on the amount of data representing an object included in graphics data, wherein the object includes one of a number of vertices, a number of triangles, a number of fragments, a lighting parameter and a texture parameter; and
    re-controlling the voltage of the power supplied to the graphics data processor based on a time difference between scheduled processing time according to the controlled voltage for the object and actual processing time consumed by the graphics data processor.

2. The method of claim 1, wherein the graphics data includes a plurality of frames corresponding to graphics data representing one scene, and
    the re-controlling of the voltage of the power comprises re-controlling the voltage of the power supplied to the graphics data processor for processing a frame input after one of the plurality of frames based on the time difference generated after processing of the last one of objects included in the one of the plurality of frames.

3. The method of claim 2, wherein the re-controlling of the voltage of the power comprises re-controlling the voltage of the power supplied to the graphics data processor for processing the first one of objects included in a frame input after one of the plurality of frames based on the time difference generated after processing of the last one of the objects included in the one of the plurality of frames.

4. The method of claim 1, wherein the voltage of the power supplied to the graphics data processor is controlled by controlling a frequency of the power supplied to the graphics data processor.

5. The method of claim 1, wherein the voltage of the power supplied to the graphics data processor is controlled by controlling voltages of power supplied to processing units of the graphics data processor.

6. The method of claim 1, further comprising:
    storing data regarding vertices of the object; and
    using the stored data if the graphics data processor re-processes the same vertex as one of the vertices of the object.

7. The method of claim 1, wherein the controlling of the voltage of the power supplied to the graphics data processor comprises controlling the voltage of the power supplied to the graphics data processor based on the amount of data of a frame included in the graphics data, and
    the re-controlling of the voltage of the power supplied to the graphics data processor comprises re-controlling the voltage of the power supplied to the graphics data processor based on a time difference between scheduled processing time according to the controlled voltage for the frame and actual processing time consumed by the graphics data processor.

8. A method of controlling a voltage of power supplied to a graphics data processor, the method comprising:
    controlling the voltage of the power supplied to the graphics data processor based on the amount of data representing an object included in graphics data; and
    re-controlling the voltage of the power supplied to the graphics data processor based on a time difference between scheduled processing time according to the controlled voltage for the object and actual processing time consumed by the graphics data processor,
    wherein the controlling of the voltage of the power supplied to the graphics data processor comprises controlling the voltage of the power supplied to the graphics data processor based on the amount of data of a frame included in the graphics data, and
    the re-controlling of the voltage of the power supplied to the graphics data processor comprises re-controlling the voltage of the power supplied to the graphics data processor based on a time difference between scheduled processing time according to the controlled voltage for the frame and actual processing time consumed by the graphics data processor, wherein
    the controlling of the voltage of the power supplied to the graphics data processor comprises controlling voltages of power supplied to processing units of the graphics data processor for each of objects included in the frame based on the amount of data of the objects included in the frame.

9. A graphics data processor capable of controlling a voltage, the graphics data processor comprising:
- a workload estimation unit estimating the amount of data representing an object included in the graphics data, wherein the object includes one of a number of vertices, a number of triangles, a number of fragments, a lighting parameter and a texture parameter;
- a voltage control unit controlling a voltage of power supplied to the graphics data processor based on a time difference between scheduled processing time according to the controlled voltage for the object and actual processing time consumed by the graphics data processor and the amount of data of a new object, which is estimated by the workload estimation unit; and
- an execution result analysis unit analyzing the time difference considered by the voltage control unit from a result of processing the graphics data by the graphics data processor.

10. The graphics data processor of claim 9, wherein the graphics data includes a plurality of frames corresponding to graphics data representing one scene, and
- the voltage control unit re-controls the voltage of the power supplied to the graphics data processor for processing a frame input after one of the plurality of frames based on the time difference generated after processing of the last one of objects included in the one of the plurality of frames.

11. The graphics data processor of claim 10, wherein the voltage control unit re-controls the voltage of the power supplied to the graphics data processor for processing the first one of objects included in a frame input after one of the plurality of frames based on the time difference generated after processing of the last one of the objects included in the one of the plurality of frames.

12. The graphics data processor of claim 9, wherein the voltage control unit controls the voltage of the power supplied to the graphics data processor by controlling a frequency of the power supplied to the graphics data processor.

13. The graphics data processor of claim 9, wherein the voltage control unit controls the voltage of the power supplied to the graphics data processor by controlling voltages of power supplied to processing units of the graphics data processor.

14. The graphics data processor of claim 9, wherein the workload estimation unit stores data regarding vertices of the object and uses the stored data if the graphics data processor re-processes the same vertex as one of the vertices of the object.

15. The graphics data processor of claim 9, wherein the workload estimation unit estimates the amount of data representing a frame included in the graphics data, and
- the voltage control unit controls the voltage of the power supplied to the graphics data processor based on a time difference between scheduled processing time according to the controlled voltage for the frame and actual processing time consumed by the graphics data processor and the amount of data of the new frame, which is estimated by the workload estimation unit, and
- the execution result analysis unit analyzes the time difference considered by the voltage control unit from a result of performing graphics data processing on the frame by the graphics data processor.

16. A graphics data processor capable of controlling a voltage, the graphics data processor comprising:
- a workload estimation unit estimating the amount of data representing an object included in the graphics data;
- a voltage control unit controlling a voltage of power supplied to the graphics data processor based on a time difference between scheduled processing time according to the controlled voltage for the object and actual processing time consumed by the graphics data processor and the amount of data of a new object, which is estimated by the workload estimation unit; and
- an execution result analysis unit analyzing the time difference considered by the voltage control unit from a result of processing the graphics data by the graphics data processor, wherein
- the workload estimation unit estimates the amount of data representing a frame included in the graphics data, and
- the voltage control unit controls the voltage of the power supplied to the graphics data processor based on a time difference between scheduled processing time according to the controlled voltage for the frame and actual processing time consumed by the graphics data processor and the amount of data of the new frame, which is estimated by the workload estimation unit, and
- the execution result analysis unit analyzes the time difference considered by the voltage control unit from a result of performing graphics data processing on the frame by the graphics data processor, wherein
- the voltage control unit controls voltages of power supplied to processing units of the graphics data processor for each of objects included in the frame based on the amount of data of the objects included in the frame.

17. A non-transitory computer-readable recording medium having recorded thereon a program for executing the method of claim 1.

* * * * *

UNITED STATES PATENT AND TRADEMARK OFFICE
CERTIFICATE OF CORRECTION

| | | |
|---|---|---|
| PATENT NO. | : 8,112,640 B2 | Page 1 of 1 |
| APPLICATION NO. | : 11/905495 | |
| DATED | : February 7, 2012 | |
| INVENTOR(S) | : Chan-min Park et al. | |

It is certified that error appears in the above-identified patent and that said Letters Patent is hereby corrected as shown below:

Title Page Item (57) (Abstract), Line 1, After "method" delete "and".

Signed and Sealed this
Twenty-ninth Day of May, 2012

David J. Kappos
*Director of the United States Patent and Trademark Office*